United States Patent
Gustavsson et al.

(10) Patent No.: US 9,179,077 B2
(45) Date of Patent: Nov. 3, 2015

(54) ARRAY CAMERA IMAGING SYSTEM AND METHOD

(71) Applicant: Sony Mobile Communications AB, Lund (SE)

(72) Inventors: Jonas Gustavsson, Lund (SE); Henrik Heringslack, Lund (SE); Daniel Linaker, Lund (SE); Mats Wernersson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 221 days.

(21) Appl. No.: 13/886,537

(22) Filed: May 3, 2013

(65) Prior Publication Data

US 2013/0335600 A1     Dec. 19, 2013

Related U.S. Application Data

(60) Provisional application No. 61/661,191, filed on Jun. 18, 2012.

(51) Int. Cl.
    *H04N 5/262*     (2006.01)
    *H04N 5/225*     (2006.01)
    *H04N 5/232*     (2006.01)

(52) U.S. Cl.
    CPC ........... *H04N 5/2621* (2013.01); *H04N 5/2258* (2013.01); *H04N 5/23232* (2013.01)

(58) Field of Classification Search
None
See application file for complete search history.

(56) References Cited

U.S. PATENT DOCUMENTS

| | | | |
|---|---|---|---|
| 6,023,535 A * | 2/2000 | Aoki | 382/299 |
| 6,208,765 B1 * | 3/2001 | Bergen | 382/268 |
| 6,285,804 B1 * | 9/2001 | Crinon et al. | 382/299 |
| 6,714,689 B1 * | 3/2004 | Yano et al. | 382/284 |
| 8,055,101 B2 * | 11/2011 | Intwala | 382/299 |
| 2005/0019000 A1 * | 1/2005 | Lim et al. | 386/46 |
| 2005/0057687 A1 * | 3/2005 | Irani et al. | 348/443 |
| 2006/0159369 A1 * | 7/2006 | Young | 382/299 |
| 2007/0019887 A1 * | 1/2007 | Nestares et al. | 382/299 |
| 2007/0269137 A1 * | 11/2007 | Ida et al. | 382/299 |
| 2009/0066719 A1 * | 3/2009 | Combes | 345/596 |
| 2009/0079876 A1 * | 3/2009 | Takeshima et al. | 348/699 |
| 2009/0110331 A1 * | 4/2009 | Takeshima et al. | 382/299 |
| 2009/0128636 A1 * | 5/2009 | Wakagi et al. | 348/208.1 |
| 2009/0129703 A1 * | 5/2009 | Takeshima et al. | 382/299 |
| 2009/0232213 A1 * | 9/2009 | Jia | 375/240.16 |
| 2009/0268984 A1 * | 10/2009 | Intwala | 382/294 |
| 2010/0033602 A1 * | 2/2010 | Okada et al. | 348/241 |
| 2010/0067822 A1 * | 3/2010 | Young | 382/264 |
| 2010/0097491 A1 * | 4/2010 | Farina et al. | 348/223.1 |
| 2010/0103175 A1 * | 4/2010 | Okutomi et al. | 345/428 |

(Continued)

OTHER PUBLICATIONS

Georgiev, Todor, et al., "Superresolution with the Focused Plenoptic Camera", SPIE Electronic Imaging, Jan. 2011.

(Continued)

*Primary Examiner* — Michael Osinski
(74) *Attorney, Agent, or Firm* — Renner, Otto, Boisselle & Sklar, LLP.

(57) ABSTRACT

Aspects of the disclosed technology relate to an imaging system and method in which an array camera is employed along with an image processor to make use of parallax convergence differences between different cameras or groups of cameras within an array camera to provide improved super resolution performance.

20 Claims, 11 Drawing Sheets

(56) References Cited

U.S. PATENT DOCUMENTS

| | | | |
|---|---|---|---|
| 2010/0141823 A1* | 6/2010 | Tsunekawa et al. | 348/333.12 |
| 2010/0253796 A1* | 10/2010 | Yano et al. | 348/222.1 |
| 2011/0080487 A1 | 4/2011 | Venkataraman et al. | |
| 2011/0115793 A1* | 5/2011 | Grycewicz | 345/428 |
| 2011/0122308 A1 | 5/2011 | Duparre | |
| 2011/0150331 A1* | 6/2011 | Young | 382/167 |
| 2012/0026295 A1* | 2/2012 | Nishimura et al. | 348/46 |
| 2012/0147205 A1* | 6/2012 | Lelescu et al. | 348/218.1 |
| 2012/0154551 A1* | 6/2012 | Inoue | 348/49 |
| 2012/0262607 A1* | 10/2012 | Shimura et al. | 348/239 |
| 2013/0004079 A1* | 1/2013 | Yamada et al. | 382/190 |
| 2013/0038698 A1* | 2/2013 | Yoshida | 348/47 |
| 2013/0162861 A1* | 6/2013 | Yamamoto | 348/222.1 |
| 2013/0250065 A1* | 9/2013 | Aoki et al. | 348/46 |
| 2013/0258044 A1* | 10/2013 | Betts-Lacroix | 348/36 |
| 2013/0308826 A1* | 11/2013 | Asano | 382/106 |
| 2013/0335598 A1* | 12/2013 | Gustavsson et al. | 348/234 |
| 2014/0009577 A1* | 1/2014 | Wakabayashi et al. | 348/43 |
| 2014/0267762 A1* | 9/2014 | Mullis et al. | 348/164 |
| 2014/0270518 A1* | 9/2014 | Yano | 382/167 |
| 2014/0354828 A1* | 12/2014 | Rubinstein et al. | 348/187 |
| 2014/0363099 A1* | 12/2014 | Evers-Senne et al. | 382/284 |

OTHER PUBLICATIONS

Georgiev, Todor et al., "Superresolution with Plenoptic Camera 2.0", Apr. 2009, Adobe Technical Report, pp. 1-9.

* cited by examiner

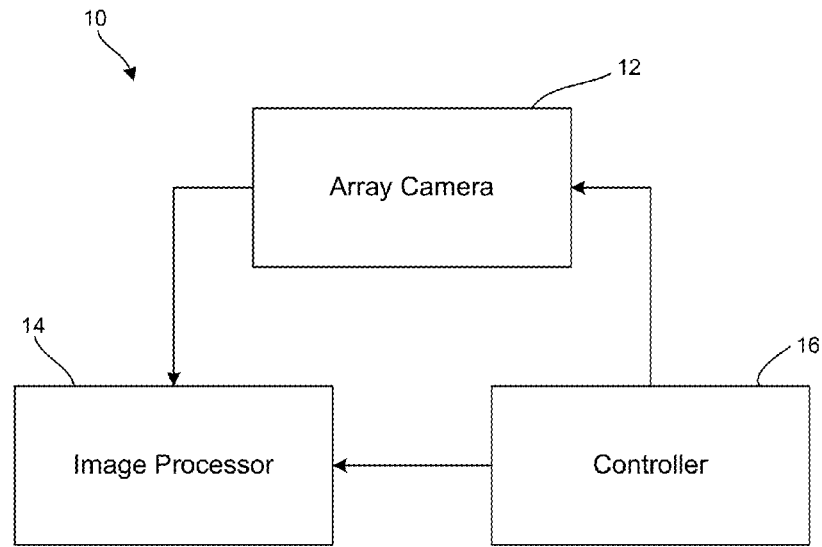
FIG. 1
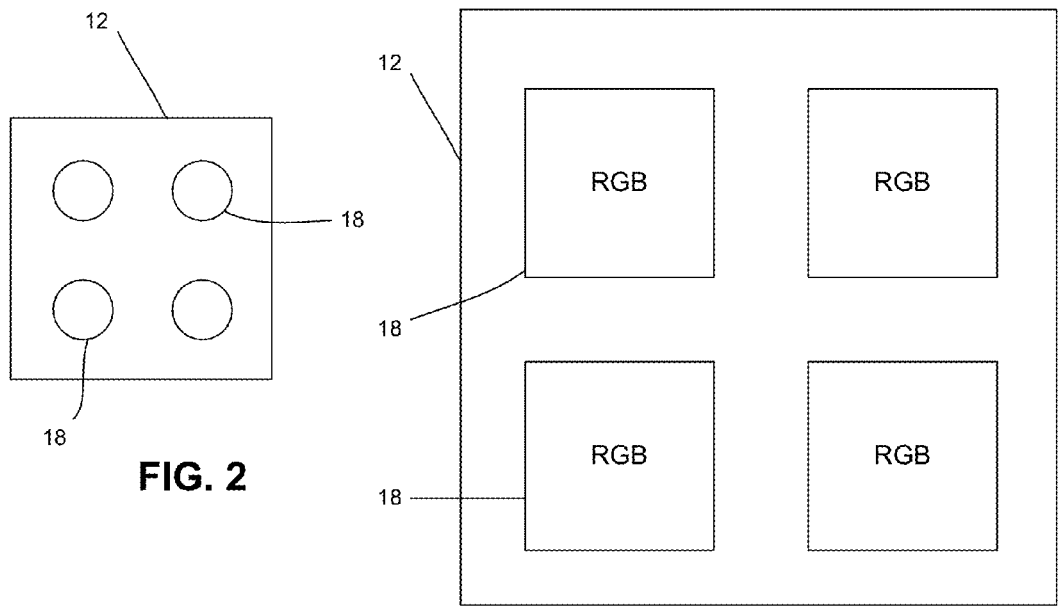
FIG. 2
FIG. 3

ARRAY CAMERA IMAGING SYSTEM AND METHOD

TECHNICAL FIELD OF THE INVENTION

The technology of the present disclosure relates generally to an imaging device and method, and more particularly to an array camera imaging device and method for producing super resolution images.

BACKGROUND

Conventional cameras typically include one or more lenses and a photodetector element for capturing image data. Array cameras (also known as light-field cameras or plenoptic cameras) employ an array of cameras that capture images from slightly different perspectives. Array cameras can be useful for capturing images when motion is involved. One drawback of conventional array cameras is that image resolution can be less than commercially desirable.

SUMMARY

Aspects of the disclosed technology relate to an imaging system and method in which an array camera is employed along with an image processor to make use of parallax convergence differences between different cameras or groups of cameras within an array camera to provide improved super resolution performance.

One aspect of the disclosed technology relates to an imaging device that includes an array camera having at least M×N cameras, where N is at least two, the camera array configured to capture M×N images; and an image processor operatively coupled to the array camera, the image processor configured to: parallax converge images from each camera based on different predefined offset points within a predefined sampling pattern to create a sub-pixel sampling pattern; and sample the sub-pixel sampling pattern at an increased resolution.

According to one feature, the array camera includes an array of 4×4 cameras.

According to one feature, the cameras within the array camera are monochromatic cameras arranged in groups.

According to one feature, for each group of cameras, the image processor is configured to parallax converging images from the group of cameras based on a different predefined offset point within the predefined sampling pattern, producing 4 group outputs.

According to one feature, the image processor is configured to parallax converge the 4 group outputs based on the different predefined offset points.

According to one feature, the increased resolution is at least a three times (3×) resolution.

According to one feature, the image processor is configured to sample the sub-pixel sampling pattern using a base sample contribution falloff.

According to one feature, the image processor is configured to sample the sub-pixel sampling pattern using a spherical sample contribution falloff to surrounding samples.

According to one feature, the predefined sampling pattern is a Hilbert sampling pattern.

According to one feature, the different predefined offset points create vertical, horizontal and diagonal differences between the 4 group outputs.

According to one feature, the predefined offset points include at least four points per pixel that are relatively offset vertically, horizontally and diagonally.

According to one feature, a portable communication device includes the imaging device described above.

According to one feature, the portable communication device is a mobile phone.

Another aspect of the disclosed technology relates to a method of generating an image that includes capturing image data using an array camera having at least N×N cameras, where N is at least two, the array camera producing N×N images, wherein the array camera includes N groups of N cameras; for each group of N cameras, parallax converging the image from the group of N cameras based on a different predefined offset point within a predefined sampling pattern, producing N group outputs; parallax converging the N group outputs based on the different predefined offset points; and creating a super resolution image by sampling each of the N group outputs based on the predefined offset points within the predefined sampling pattern at an increased resolution.

According to one feature, N=4 and the cameras within the array camera are monochromatic cameras.

According to one feature, the increased resolution is at least a three times (3×) resolution.

According to one feature, sampling includes using a base sample contribution falloff.

According to one feature, sampling includes using a base sample contribution falloff to five surrounding samples.

According to one feature, the predefined sampling pattern is a Hilbert sampling pattern.

According to one feature, the different predefined offset points create vertical, horizontal and diagonal differences between the 4 group outputs.

According to one feature, the predefined offset points include at least four points per pixel offset vertically, horizontally and diagonally.

Another aspect of the disclosed technology relates to a method of generating a super resolution image that includes capturing image data using an array camera having at least four cameras; parallax converging image data from each camera based on different predefined offset points within a predefined sampling pattern to create a sub-pixel sampling pattern; and sampling the sub-pixel sampling pattern at an increased resolution.

According to one feature, the increased resolution is at least a three times (3×) resolution.

According to one feature, sampling includes using a base sample contribution falloff.

According to one feature, sampling includes using a base sample contribution falloff to five surrounding samples.

According to one feature, the predefined sampling pattern is a Hilbert sampling pattern.

According to one feature, the different predefined offset points create vertical, horizontal and diagonal differences between the image data from the four cameras.

According to one feature, the predefined offset points include at least four points per pixel offset vertically, horizontally and diagonally.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

BRIEF DESCRIPTION OF THE DRAWINGS

FIG. 1 is a functional block diagram of an imaging device in accordance with one aspect of the disclosed technology;

FIG. 2 is a diagrammatic illustration of an exemplary array camera in accordance with one aspect of the disclosed technology;

FIG. 3 is a diagrammatic illustration of an exemplary array camera in accordance with one aspect of the disclosed technology;

DETAILED DESCRIPTION OF EMBODIMENTS

Figure 4:
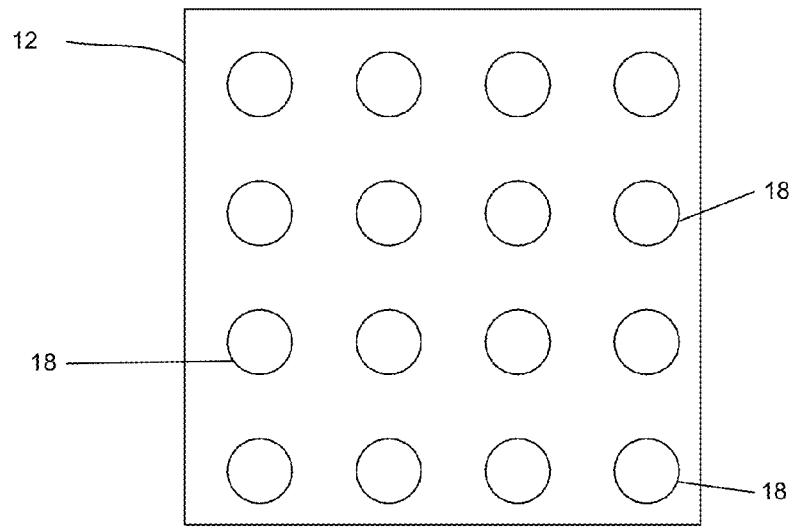
FIG. 4 is a diagrammatic illustration of an exemplary array camera in accordance with one aspect of the disclosed technology.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described more fully below in conjunction with the appended figures are various embodiments of an imaging system and method in which an array camera is employed along with an image processor to make use of parallax convergence differences between different cameras or groups of cameras within an array camera to provide improved super resolution performance. The present disclosure uses difference information from respective images from cameras within an array camera to create additional image pixels for resolution enhancement. In accordance with one exemplary embodiment in which the array camera includes four cameras, or four groups of cameras in the case of monochromatic cameras, use of parallax convergence differences between different cameras or groups of cameras drives a super resolution implementation with at least a three times (3×) resolution improvement.

It will be appreciated that the disclosed imaging device and imaging method technology may be applied to other operational contexts such as, but not limited to, a dedicated camera or another type of electronic device that has a camera. Examples of these other devices include, but are not limited to a video camera, a digital photo viewer (sometimes referred to as a digital picture frame), a navigation device (commonly referred to as a "GPS" or "GPS device"), a personal digital assistant (PDA), a media player (e.g., an MP3 player), a gaming device, a "web" camera, a computer (including a laptop, an "ultra-mobile PC" or other type of computer), and an accessory for another electronic device.

Turning now to FIG. 1, a functional block diagram of an imaging device 10 is provided. In accordance with one exemplary embodiment, the imaging device 10 can include, among other components, a suitable array camera 12, an image processor 14 operatively coupled to the camera array and a controller 16 operatively coupled to the array camera 12 and the image processor.

Figure 5:
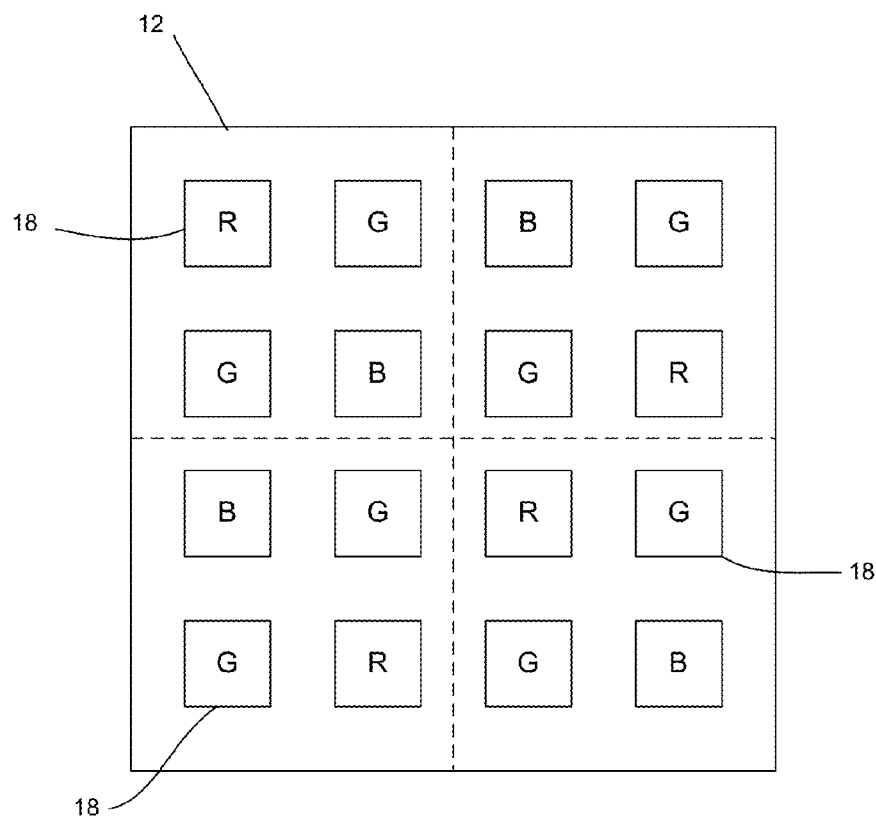
FIG. 5 is a diagrammatic illustration of an exemplary array camera in accordance with one aspect of the disclosed technology.

It will be appreciated that the array camera 12 can take on any suitable geometry or configuration. For example, in accordance with one embodiment, the array camera can be configured to include an array of M×N cameras (designated generally as 18), where M and N are at least two. For example, as shown in FIG. 2 and FIG. 3, the array camera can include four cameras (e.g., RGB cameras). In accordance with another exemplary embodiment, the array camera 12 can be configured as an array of N×N cameras 18, where each camera 18 within the array is a monochromatic camera, and the monochromatic cameras are arranged in groups. For example, as shown in FIGS. 4 and 5, the array camera can be configured as an array of 4×4 monochromatic cameras arranged in four groups. The cameras 18 may be arranged in a Bayer pattern (see, FIG. 5, for example) or in any other suitable geometry or configuration for producing color images.

In an embodiment the array camera may be as few as two cameras, and in other embodiments the array camera may be more than the number of cameras elsewhere described by way of example herein.

The array camera 12 can be configured to include a number of single cameras (e.g., including individual lenses and individual photosensors) or as an array of lenses or microlenses together with a larger photosensor). The individual cameras within the array camera can be arranged in any suitable configuration without departing from the scope of the disclosed technology. As discussed above, in one embodiment, cameras are arranged into a grid format. In other embodiments, the cameras can be arranged in a non-grid format. For example, the cameras can be arranged in a linear pattern, a circular pattern or any other suitable pattern, including sub-pixel offsets.

In accordance with one embodiment, the array camera can be fabricated on a semiconductor chip to include a plurality of photosensor elements. Each of the cameras can include a plurality of pixels (e.g., 0.32 Mega pixels or may be some other number of pixels). The array camera can include two or more types of heterogeneous cameras, with each camera including two or more sensor elements or pixels. It will be appreciated that each one of the cameras can have different imaging characteristics. Alternatively, there may be two or more different types of cameras where the same type of imager shares the same imaging characteristics.

In accordance with one embodiment, each camera can include its own filter and/or optical element (e.g., lens). Each of the cameras or group of cameras can be associated with spectral color filters to receive certain wavelengths of light. Example filters include a traditional filter used in the Bayer pattern (R, G, B or their complements C, M, Y), an IR-cut filter, a near-IR filter, a polarizing filter, and a custom filter to suit the needs of hyper-spectral imaging. Some cameras can have no filter to allow reception of both the entire visible spectra and near-IR, which increases the cameras signal-to-noise ratio. The number of distinct filters may be as large as the number of cameras in the camera array. Further, each of the cameras or group of cameras can receive light through lenses having different optical characteristics (e.g., focal lengths) or apertures of different sizes.

It will be appreciated that a photosensor, a sensor element or pixel refers to an individual light sensing element in a camera. The light sensing element can be, but is not limited to, traditional CIS (CMOS Image Sensor), CCD (charge-coupled device), high dynamic range pixel, multispectral pixel and various alternatives thereof. In addition, a photosensor or simply a sensor can refer to a two-dimensional array of pixels used to capture an image formed on the sensor by the optics of the camera. The sensor elements of each sensor have similar physical properties and receive light through the same optical component. Further, the sensor elements in the each sensor may be associated with the same color filter.

Image data is captured by each camera within the array. (Although the image data is described herein as being captured by each camera within the array, it will be appreciated that the image data may be received from some other source, e.g., stored in a memory for long or short term storage or received from a remote source, and so on. The image data is processed by the processor 14 as set forth in more detail below to provide super resolution enhancement. In accordance with one exemplary embodiment, where the array camera includes at least four cameras (or at least four groups of cameras in the case of monochromatic cameras), the processor 14 processes the image data from the various cameras to provide an output image with at least three times (3×) resolution increase. It will be appreciated that other super resolution performance may be achieved depending on the number of cameras within the array camera.

It will be appreciated that the array camera 12 can include other related circuitry. The other circuitry may include, among others, circuitry to control imaging parameters and sensors to sense physical parameters. The control circuitry may control imaging parameters such as exposure times, gain, and black level offset. The sensor may include dark pixels to estimate dark current at the operating temperature. The dark current may be measured for on-the-fly compensation for any thermal creep that the substrate may suffer from. Alternatively, compensation of thermal effects associated with the optics, e.g., because of changes in refractive index of the lens material, may be accomplished by calibrating the PSF for different temperatures.

In accordance with one embodiment, the controller 16 (e.g., a circuit for controlling imaging parameters) may trigger each camera independently or in a synchronized manner. The start of the exposure periods for the various cameras in the array camera (analogous to opening a shutter) may be staggered in an overlapping manner so that the scenes are sampled sequentially while having several cameras being exposed to light at the same time. In a conventional video camera sampling a scene at X exposures per second, the exposure time per sample is limited to 1/X seconds. With a plurality of cameras, there is no such limit to the exposure time per sample because multiple cameras may be operated to capture images in a staggered manner. In an embodiment two or more of the cameras may be triggered simultaneously.

Each camera can be operated independently. Entire or most operations associated with each individual camera can be individualized. In one embodiment, a master setting is programmed and deviation (i.e., offset or gain) from such master setting is configured for each camera. The deviations may reflect functions such as high dynamic range, gain settings, integration time settings, digital processing settings or combinations thereof. These deviations can be specified at a low level (e.g., deviation in the gain) or at a higher level (e.g., difference in the ISO number, which is then automatically translated to deltas for gain, integration time, or otherwise as specified by context/master control registers) for the particular array camera. By setting the master values and deviations from the master values, higher levels of control abstraction can be achieved to facilitate a simpler programming model for many operations. In one embodiment, the parameters for the cameras are arbitrarily fixed for a target application. In another embodiment, the parameters are configured to allow a high degree of flexibility and programmability.

In accordance with one embodiment, the array camera can be designed as a drop-in replacement for existing camera image sensors used in cell phones and other mobile devices. For this purpose, the array camera can be designed to be physically compatible with conventional image sensors of approximately the same resolution, although the achieved resolution of the array camera can exceed conventional image sensors in many photographic situations. Taking advantage of the increased performance, the array camera, in accordance with embodiments of the disclosed technology, can include fewer pixels to obtain equal or better quality images compared to conventional image sensors. Alternatively, the size of the pixels in the imager may be reduced compared to pixels in conventional image sensors while achieving comparable results.

The controller 16 can be configured or otherwise implemented as hardware, software, firmware or a combination thereof for controlling various operation parameters of the camera array 12 and the image processor 14. The controller 16 can receive inputs from a user or other external components and sends operation signals to control the camera array 12. The controller 16 may also send information to the image processor 14 to assist in processing the images.

Likewise, the image processor 14 can include suitable hardware, firmware, software or a combination for processing the images received from the array camera 12. The image processor 14 processes multiple images from the cameras or groups of cameras, for example, as described below in detail with reference to FIG. 6 and FIG. 7. The super resolution processed image then can be sent for display, storage, transmittal or further processing.

As is discussed more fully below, the processor is configured to converge image data from different cameras onto different sample points that are relatively offset vertically horizontally and diagonally. After the sample points are redistributed onto a new image, it is possible to achieve an image that is higher in resolution than the original image (a so-called super resolution image).

Figure 6:
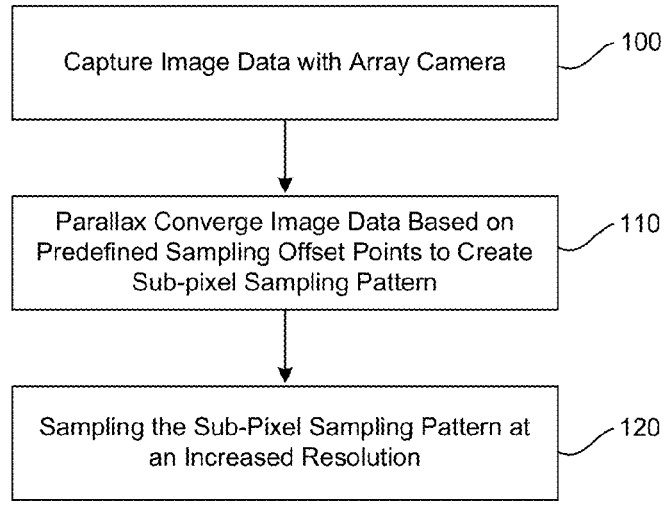
FIG. 6 is a flow diagram of an imaging method in accordance with one exemplary embodiment of the disclosed technology.
Figure 7:
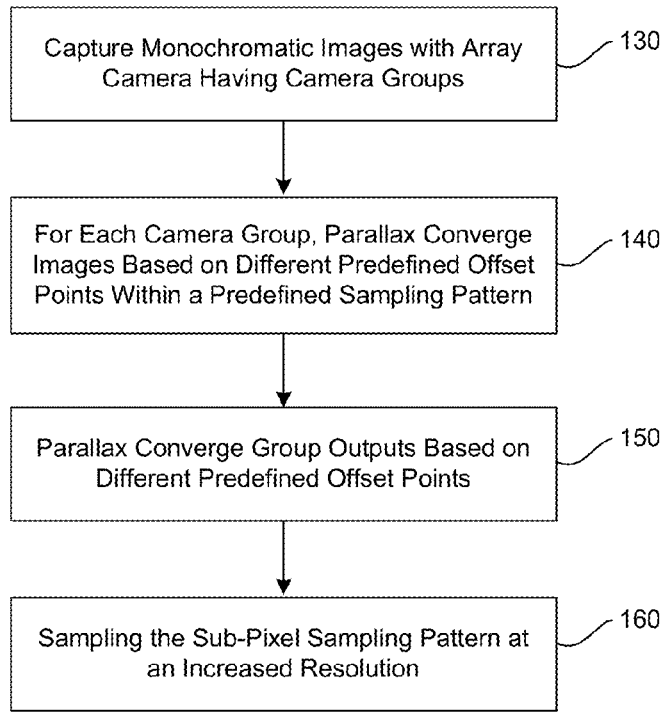
FIG. 7 is a flow diagram of an imaging method in accordance with one exemplary embodiment of the disclosed technology.

Turning now to FIG. 6 and FIG. 7, exemplary imaging methods are illustrated. FIG. 6 illustrates an exemplary imaging method based on a number of color images captured with an array camera (e.g., an array camera including a 2×2 array of RGB cameras). FIG. 7 illustrates an imaging method where image data is captured using an array camera including groups of monochromatic cameras (e.g., an array camera including a 4×4 array of monochromatic cameras arranged in a Bayer pattern). It will be appreciated that while FIG. 6 and FIG. 7 include steps 100 and 130 for capturing image data with an array camera, the below-described imaging methods can be performed by simply receiving image data corresponding to array camera image data (e.g., previously captured array camera image data) without departing from the scope of the disclosed technology.

Variations to the illustrated methods are possible and, therefore, the illustrated embodiments should not be considered the only manner of carrying out the techniques that are disclosed in this document. Also, while FIG. 6 and FIG. 7 show a specific order of executing functional logic blocks, the order of executing the blocks may be changed relative to the order shown and/or may be implemented in an object-oriented manner or a state-oriented manner. In addition, two or more blocks shown in succession may be executed concurrently or with partial concurrence. Certain blocks also may be omitted. The exemplary method may be carried out by executing code stored by the electronic device, for example. The code may be embodied as a set of logical instructions that may be executed by a processor. Therefore, the methods may be embodied as software in the form of a computer program that is stored on a computer readable medium, such as a memory.

With reference to FIG. 6, at step 100, image data is captured using the array camera. As is discussed more fully above, the array camera can be configured in numerous ways without departing from the scope of the disclosed technology. For example, the array camera can be configured to include four RGB cameras or four groups of four monochromatic cameras in a Bayer configuration. At step 110, the image data from the array camera is parallax converged based on predefined sampling offset points to create a sub-pixel sampling pattern. In accordance with one embodiment, the predefined sampling offset points are selected to include at least four points per pixel that are relatively offset vertically, horizontally and diagonally. It will be appreciated that defining offset sampling points (e.g., sampling points offset vertically, horizontally and diagonally relative to one another), provides a situation where the images are converged, but not completely converged (only converged at designated sample points).

Figure 8:
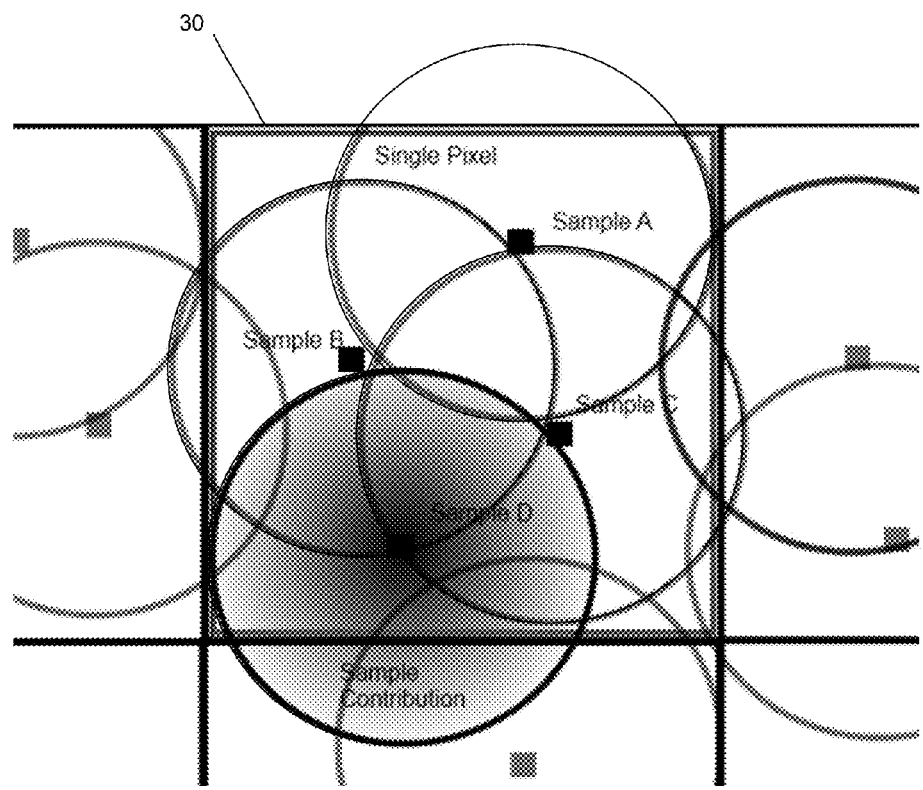
FIG. 8 is a diagrammatic illustration of predefined offset positions and an associated sampling technique in accordance with one aspect of the disclosed technology.

FIG. 8 is a diagrammatic representation of a pixel 30 (e.g., a pixel of image data captured with one or more cameras within an array camera) together with predefined offset sample points A, B, C and D within the pixel 30. The exemplary sampling pattern provides parallax converging in an indirect manner to capture vertical, horizontal and diagonal details (difference details). Each of offset sample points A, B, C and D within pixel 30 is offset vertically, horizontally and/or diagonally with respect to the center of the pixel and with respect to each other. The exemplary predefined offset sampling pattern shown in FIG. 8 can be thought of as a slightly shifted cross pattern that provides vertical, horizontal and diagonal differences between the four images captured by the array camera. In accordance with one embodiment, the sampling points A, B, C and D are defined at offset positions as far apart as possible, while providing a repeatable sampling pattern throughout the image data.

Stated differently, the incomplete parallax convergence takes one pixel from each of the four images and uses the difference between the different images (pixel 1, for example, on each of the four images) to converge on the different respective sample points to allow recreation of information within the image. Instead of converging at the center of a given pixel for each camera, the convergence is offset to a predefined location desirable for sampling the image data from the specific camera to allow recreation of information within the image.

While this embodiment has been described with respect to four predefined offset sample points, it will be appreciated that the disclosed technology is not limited to this number of predefined offset sampling points. For example, three, four, five or more sampling points per pixel could be defined without departing from the scope of the disclosed technology. Regardless of the number of predefined offset sampling points, the sampling points should be chosen to be spaced evenly over the given pixel and the adjacent pixels.

It will be appreciated that the parallax converging discussed above can be achieved using a suitable parallax correction algorithm (except it is based on the predefined offset points). It also will be appreciated that the disclosed sampling methodology allows for sampling image information outside the current pixel of interest (e.g., outside pixel 30 in FIG. 8).

At step 120, the sub-pixel sampling pattern created at step 110 is sampled according to the predefined sampling pattern at an increased resolution (providing a super resolution image). In accordance with one exemplary embodiment in which four images from four cameras are converged, the resolution increased sampling in the form of a three-times (3×) super resolution increase. FIG. 8 shows an exemplary sample distribution in which the single pixel 30 and there are the sampling points A, B, C, D. In accordance with one embodiment, for every pixel of interest in the original image data, the sub-pixel sampling pattern is sampled at nine pixels for every pixel of interest using a spherical falloff (e.g., linear falloff) from each predefined offset position, as is described and illustrated further with respect to FIG. 9. The circles in FIG. 8 are two-dimensional representations of the spherical falloff sampling, showing the contribution value to the output pixel on the resolution enhanced (e.g., 3× resolution enhanced) output image.

In accordance with one exemplary embodiment, the predefined sampling pattern is a Hilbert pattern. It will be appreciated that other sampling patterns can be employed without departing from the scope of the disclosed technology.

Figure 9:
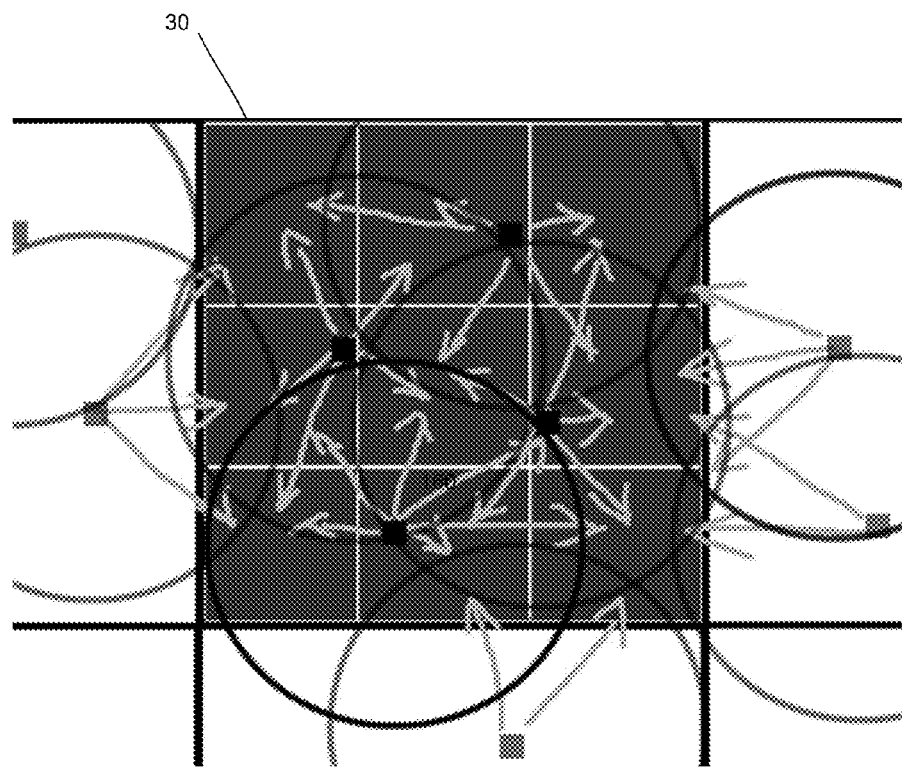
FIG. 9 is a diagrammatic illustration of a resolution-enhanced sampling technique in accordance with one aspect of the disclosed technology.

FIG. 9 shows the single pixel 30 depicted in FIG. 8 now sampled at nine pixels, providing a three-times (3×) resolution increase. The arrows in FIG. 9 also show sample contributions to the individual super resolution pixels (the nine pixels within original pixel 30). It will be appreciated that the linear falloff means that samples closer to a destination pixel will contribute more to the individual pixel in the new resolution-enhanced sampling pattern.

Various techniques may be used to compute falloff. For example, referring to FIG. 8, the contribution falloff may be linear from one sample point to the next. For example, with respect to sampling point D, the contribution from sampling point D falls off linearly from approximately 100% to approximately 0% at sampling point C.

Turning now to FIG. 7, an exemplary imaging method is illustrated where image data is captured using an array camera including groups of monochromatic cameras (e.g., an array camera including a 4×4 array of monochromatic cameras arranged in a Bayer pattern). Aspects of the method in FIG. 7, which correspond to elements depicted in FIG. 6, will not be re-described here. Rather, reference will be made to the above description for FIG. 6. At step 130 image data is captured using the array camera. In this exemplary embodiment, the array camera includes four groups of four monochromatic cameras in a Bayer configuration. At step 140, for each camera group, image data (e.g., RGB image data) is parallax converged based on the predefined offset sample point within the predefined sampling pattern. In other words, the four monochromatic images for each camera group are parallax converged into a full color image to an offset sampling point within the predefined offset sampling points. In the exemplary embodiment discussed here, the 16 monochromatic images are parallax converged into 4 color images, each based on a different predefined offset sampling point.

At step 150, the parallax converged group outputs (color images) are parallax converged based on the predefined offset points. Step 150 of FIG. 7 corresponds substantially to step 110 of FIG. 6, so the detailed discussion will not be repeated here. Rather, reference is made to the above discussion of step 110 in FIG. 6. Similarly, step 160 of FIG. 7 corresponds substantially to step 120 of FIG. 6, so the detailed discussion will not be repeated here. Rather, reference is made to the above discussion of step 120 in FIG. 6.

As is discussed above, the imaging method provides for converging image data from different cameras onto different sample points that are relatively offset vertically horizontally and diagonally. After the sample points are redistributed onto a new image, it is possible to achieve an image that is higher in resolution than the original image (a so-called super resolution image). In accordance with one exemplary embodiment, the array camera can be configured as 2.5 megapixel camera with 4×4 array, which generates a super resolution image of approximately 12 megapixels.

Figure 10:
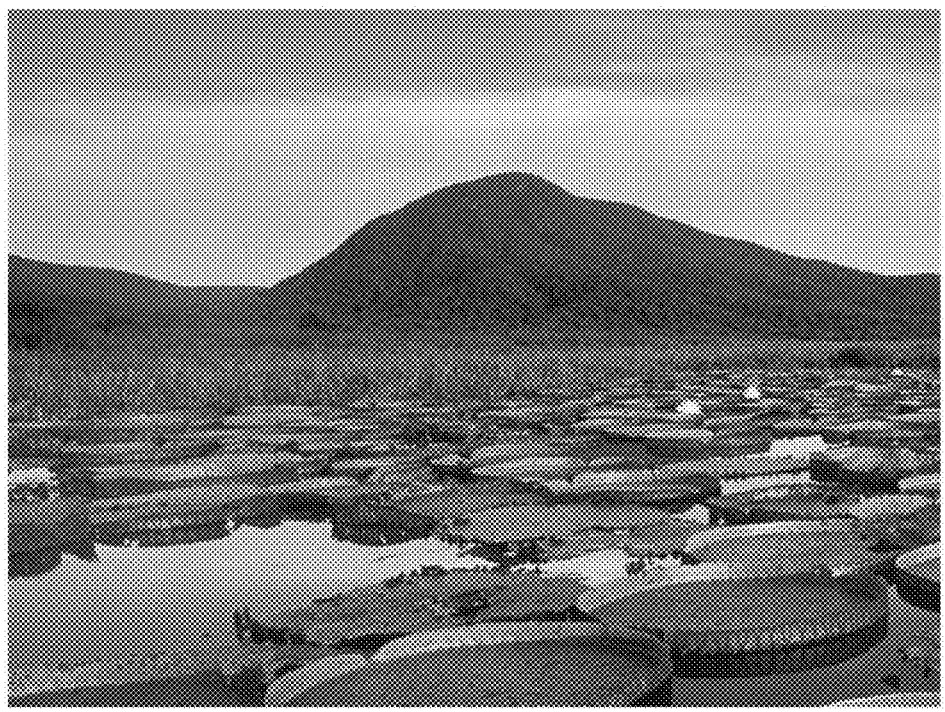
FIG. 10 is an exemplary optical source in the form of a scene to be captured by an array camera.
Figure 11:
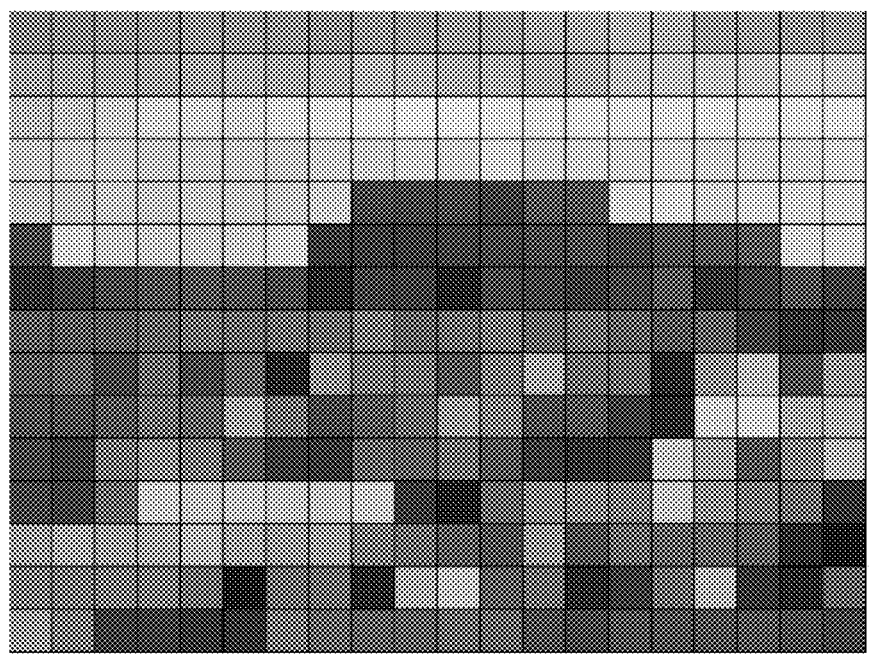
FIG. 11 is an exemplary low resolution pixel output corresponding to the scene of FIG. 10.
Figure 12:
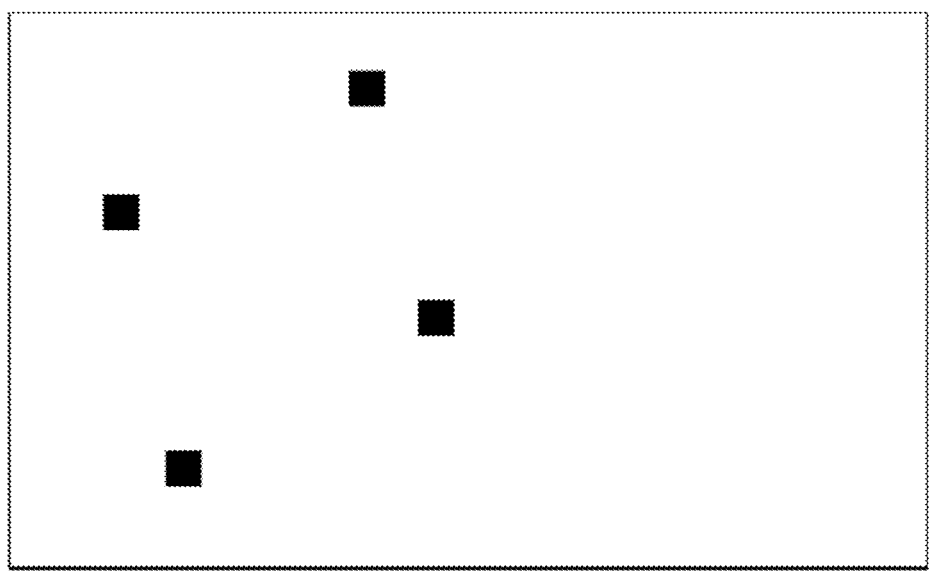
FIG. 12 is an exemplary predefined offset sampling pattern.
Figure 13:
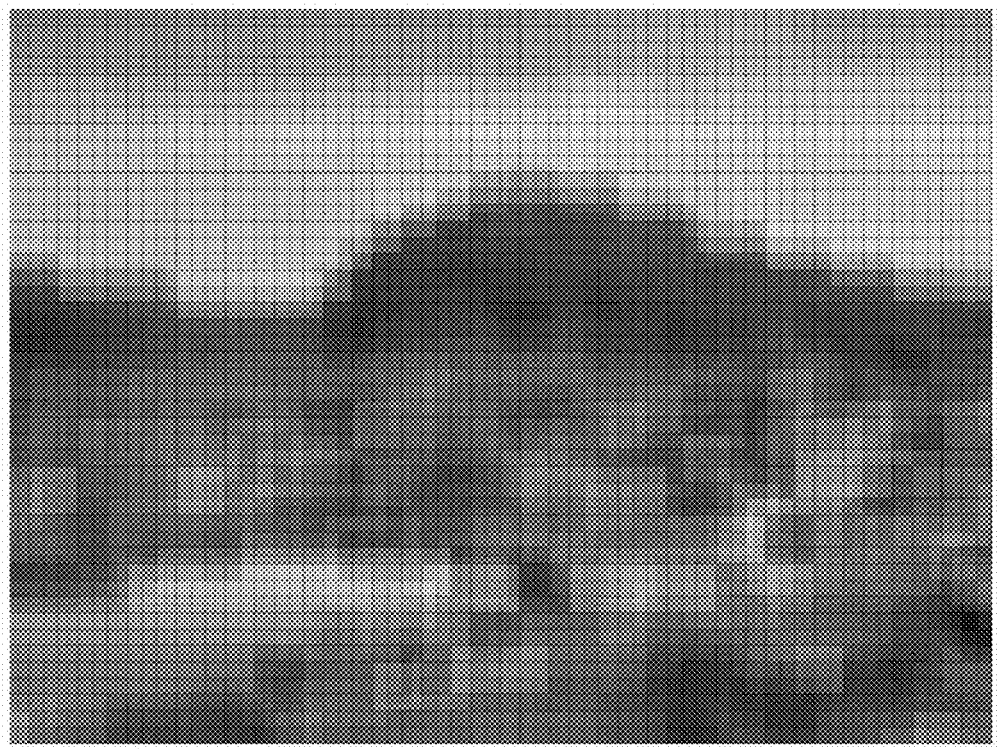
FIG. 13 is an exemplary sub-pixel sampling pattern corresponding to FIGS. 10-12.

Turning now to FIGS. 10-13, exemplary image data illustrating the effect of the above-described exemplary imaging methods is provided. FIG. 10 shows an exemplary optical source (e.g., a scene to be captured by the array camera). FIG. 11 shows exemplary pixel output from one low-resolution camera or camera group. FIG. 12 shows an exemplary predefined sampling offset pattern (similar to that depicted in FIG. 8). FIG. 13 shows an exemplary sub-pixel sampling pattern (e.g., step 110 of FIG. 6 and step 150 of FIG. 7).

Figure 14:
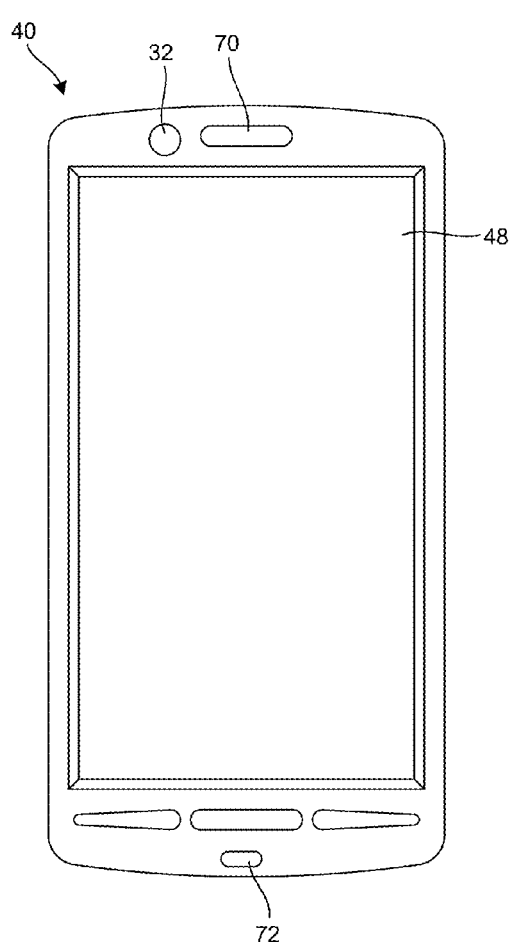
FIGS. 14 and 15 are respectively a front view and a rear view of an exemplary electronic device that includes an exemplary array camera.
Figure 15:
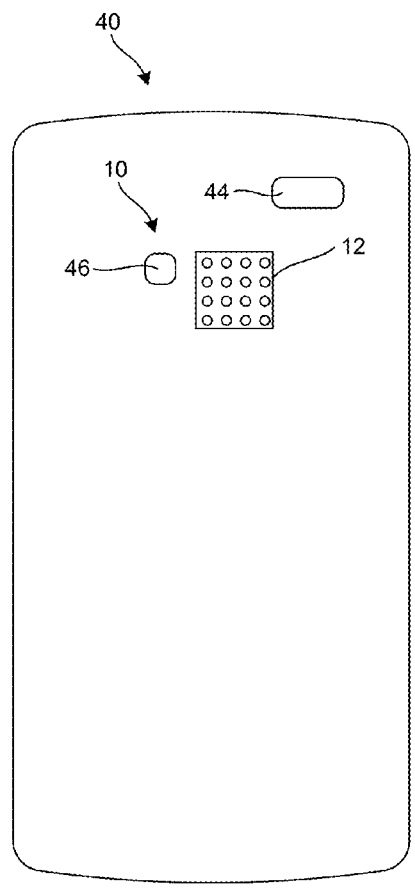
Figure 16:
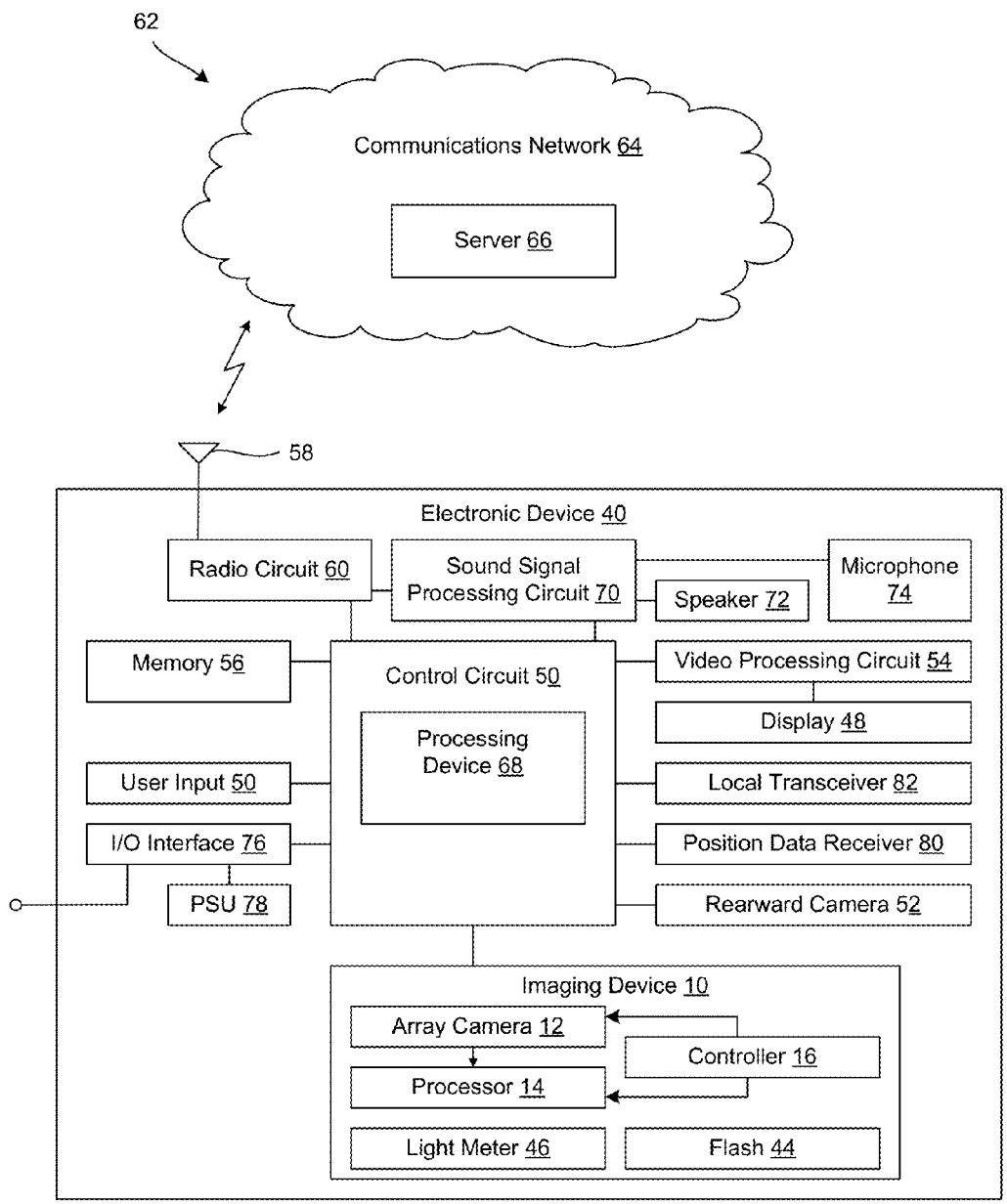
FIG. 16 is a schematic block diagram of the electronic device of FIGS. 14 and 15 as part of a communications system in which the electronic device may operate.

Turning now to FIGS. 14-16, it will be appreciated that the imaging device 10 may be embodied in a standalone camera, in a portable communication device, such as a mobile telephone, or in any other suitable electronic device.

Referring initially to FIGS. 14 and 15, an electronic device 40 is shown. The illustrated electronic device 40 is a mobile telephone. The electronic device 40 includes an imaging device 10 in the form of an array camera 12 for taking digital still pictures and/or digital video clips. It is emphasized that the electronic device 40 need not be a mobile telephone, but could be a dedicated camera or some other device as indicated above.

With additional reference to FIG. 16, the imaging device 10 can include imaging optics 42 to focus light from a scene within the field of view of the imaging device 10. As is discussed above, the imaging device can include an array camera 12 operatively coupled to a processor 14 and a controller 16.

The imaging optics 42 may include a lens assembly and any other components that supplement the lens assembly, such as a protective window, a filter, a prism, and/or a mirror. To adjust the focus of the array camera 12, a focusing assembly that includes focusing mechanics and/or focusing control electronics may be present in conjunction with the imaging optics 42. A zooming assembly also may be present to optically change the magnification of captured images.

Other array camera 12 components may include a distance meter (also referred to as a rangefinder), a supplemental illumination source (e.g., a flash 44), a light meter 46, a display 48 for functioning as an electronic viewfinder, an optical viewfinder (not shown), and any other components commonly associated with cameras.

A user input 50 may be present for accepting user inputs. The user input 50 may take one or more forms, such as a touch input associated with the display 48, a keypad, buttons, and so forth. One user input function may be a shutter key function that allows the user to command the taking of a photograph. In one embodiment, the display 48 has a relatively fast refresh rate. Most commercially available organic light emitting diode (OLED) displays have a satisfactory refresh rate for purposes of the disclosed techniques for displaying a photo.

Another component of the array camera 12 may be an electronic controller 16 that controls operation of the array camera 12. As discussed above, the controller 16 may be embodied, for example, as a processor that executes logical instructions that are stored by an associated memory, as firmware, as an arrangement of dedicated circuit components, or as a combination of these embodiments. Thus, processes for operating the array camera 12 may be physically embodied as executable code (e.g., software) that is stored on a computer readable medium (e.g., a memory), or may be physically embodied as part of an electrical circuit. In another embodiment, the functions of the controller 16 may be carried out by a control circuit 50 that is responsible for overall operation of the electronic device 10. In this case, the controller 16 may be omitted. In another embodiment, array camera 12 control functions may be distributed between the controller 16 and the control circuit 50.

In addition to the array camera 12, the electronic device 10 may include a rearward facing camera 52. The rearward facing camera 52 may be arranged so as to be directed toward and capable of capturing images or video of the user of the electronic device 10 when the user views the display 48. In one embodiment, the rearward camera 52 may be used in connection with video telephony to capture images or video of the user for transmission to a called or calling device.

Additional features of the electronic device 40, when implemented as a mobile telephone, will be described with additional reference to FIG. 16. The display 48 displays graphical user interfaces, information and content (e.g., images, video and other graphics) to a user to enable the user to utilize the various features of the electronic device 10. The display 48 may be coupled to the control circuit 50 by a video processing circuit 54 that converts video data to a video signal used to drive the display 48. The video processing circuit 54 may include any appropriate buffers, decoders, video data processors and so forth.

The electronic device 40 includes communications circuitry that enables the electronic device 40 to establish communication with another device. Communications may include voice calls, video calls, data transfers, and the like. Communications may occur over a cellular circuit-switched network or over a packet-switched network (e.g., a network compatible with IEEE 802.11, which is commonly referred to as WiFi, or a network compatible with IEEE 802.16, which is commonly referred to as WiMAX). Data transfers may include, but are not limited to, receiving streaming content, receiving data feeds, downloading and/or uploading data (including Internet content), receiving or sending messages (e.g., text messages, instant messages, electronic mail messages, multimedia messages), and so forth. This data may be processed by the electronic device 40, including storing the data in the memory 56, executing applications to allow user interaction with the data, displaying video and/or image content associated with the data, outputting audio sounds associated with the data, and so forth.

In the exemplary embodiment, the communications circuitry may include an antenna 58 coupled to a radio circuit 60. The radio circuit 60 includes a radio frequency transmitter and receiver for transmitting and receiving signals via the antenna 58. The radio circuit 60 may be configured to operate in a mobile communications system 62. Radio circuit 60 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, integrated services digital broadcasting (ISDB), high speed packet access (HSPA), etc., as well as advanced versions of these standards or any other appropriate standard. It will be appreciated that the electronic device 40 may be capable of communicating using more than one standard. Therefore, the antenna 58 and the radio circuit 60 may represent one or more than one radio transceiver.

The system 62 may include a communications network 64 having a server 66 (or servers) for managing calls placed by and destined to the electronic device 40, transmitting data to and receiving data from the electronic device 40, and carrying out any other support functions. The server 66 communicates with the electronic device 40 via a transmission medium. The transmission medium may be any appropriate device or assembly, including, for example, a communications base station (e.g., a cellular service tower, or "cell" tower), a wireless access point, a satellite, etc. The network 64 may support the communications activity of multiple electronic devices 40 and other types of end user devices. As will be appreciated, the server 66 may be configured as a typical computer system used to carry out server functions and may include a processor configured to execute software containing logical instructions that embody the functions of the server 66 and a memory to store such software. In alternative arrangements, the electronic device 40 may wirelessly communicate directly with another electronic device 40 (e.g., another mobile telephone or a computer) and without an intervening network.

As indicated, the electronic device 40 may include the primary control circuit 50 that is configured to carry out overall control of the functions and operations of the electronic device 40. The control circuit 50 may include a processing device 68, such as a central processing unit (CPU), microcontroller or microprocessor. The processing device 68 executes code stored in a memory (not shown) within the control circuit 50 and/or in a separate memory, such as the memory 56, in order to carry out operation of the electronic device 40. The memory 56 may be, for example, one or more of a buffer, a flash memory, a hard drive, a removable media, a volatile memory, a non-volatile memory, a random access memory (RAM), or other suitable device. In a typical arrangement, the memory 56 may include a non-volatile memory for long term data storage and a volatile memory that functions as system memory for the control circuit 50. The memory 56 may exchange data with the control circuit 30 over a data bus. Accompanying control lines and an address bus between the memory 56 and the control circuit 50 also may be present.

The electronic device 40 further includes a sound signal processing circuit 70 for processing audio signals transmitted by and received from the radio circuit 60. Coupled to the sound processing circuit 70 are a speaker 72 and a microphone 74 that enable a user to listen and speak via the electronic device 40, and hear sounds generated in connection with other functions of the device 40. The sound processing circuit 70 may include any appropriate buffers, encoders, decoders, amplifiers and so forth.

The electronic device 40 may further include one or more input/output (I/O) interface(s) 76. The I/O interface(s) 76 may be in the form of typical mobile telephone I/O interfaces and may include one or more electrical connectors for operatively connecting the electronic device 10 to another device (e.g., a computer) or an accessory (e.g., a personal handsfree (PHF) device) via a cable. Further, operating power may be received over the I/O interface(s) 76 and power to charge a battery of a power supply unit (PSU) 78 within the electronic device 40 may be received over the I/O interface(s) 76. The PSU 78 may supply power to operate the electronic device 40 in the absence of an external power source.

The electronic device 40 also may include various other components. A position data receiver 80, such as a global positioning system (GPS) receiver, may be involved in determining the location of the electronic device 40. A local wireless transceiver 820, such as a Bluetooth chipset, may be used to establish communication with a nearby device, such as an accessory (e.g., a PHF device), another mobile radio terminal, a computer or another device.

Although certain embodiments have been shown and described, it is understood that equivalents and modifications falling within the scope of the appended claims will occur to others who are skilled in the art upon the reading and understanding of this specification.

What is claimed is:

1. An imaging device comprising:
an array camera having at least M×N cameras, the camera array configured to capture M×N images, where M and N are positive integers having a product of at least two; and
an image processor operatively coupled to the array camera, the image processor configured to:
parallax converge images from each camera of the array camera based on different predefined offset points within a predefined sampling pattern to create a sub-pixel sampling pattern; and
sample the sub-pixel sampling pattern at an increased resolution to provide a super resolution output image.

2. The imaging device of claim 1, wherein the array camera includes an array of 4×4 cameras.

3. The imaging device of claim 1, wherein the cameras within the array camera are monochromatic cameras arranged in groups.

4. The imaging device of claim 3, wherein, for each group of cameras, the image processor is configured to parallax converge images from the group of cameras based on a different predefined offset point within the predefined sampling pattern, producing 4 group outputs.

5. The imaging device of claim 4, wherein the image processor is configured to parallax converge the 4 group outputs based on the different predefined offset points.

6. The imaging device of claim 1, wherein the increased resolution is at least a three times (3×) resolution.

7. The imaging device of claim 1, wherein the image processor is configured to sample the sub-pixel sampling pattern using a base sample contribution falloff.

8. The imaging device of claim 7, wherein the image processor is configured to sample the sub-pixel sampling pattern using a spherical sample contribution falloff sampling to surrounding samples.

9. The imaging device of claim 1, wherein the predefined sampling pattern is a Hilbert sampling pattern.

10. The imaging device of claim 4, wherein the different predefined offset points create vertical, horizontal and diagonal differences between the 4 group outputs.

11. The imaging device of claim 1, wherein the predefined offset points include at least four points per pixel that are relatively offset vertically, horizontally and diagonally.

12. A portable communication device comprising the imaging device of claim 1.

13. The portable communication device of claim 12, wherein the portable communication device is a mobile phone.

14. A method of generating an image, the method comprising:
- capturing image data using an array camera having at least N×N cameras, where N is at least two, the array camera producing N×N images, wherein the array camera includes N groups of N cameras;
- for each group of N cameras of the array camera, parallax converging the image from the group of N cameras based on a different predefined offset point within a predefined sampling pattern, producing N group outputs;
- parallax converging the N group outputs based on the different predefined offset points; and
- creating a super resolution image by sampling each of the N group outputs based on the predefined offset points within the predefined sampling pattern at an increased resolution.

15. The method of claim 14, wherein N=4 and the cameras within the array camera are monochromatic cameras.

16. The method of claim 14, wherein the increased resolution is at least a three times (3×) resolution.

17. The method of claim 14, wherein sampling includes using a base sample contribution falloff.

18. The method of claim 14, wherein the different predefined offset points create vertical, horizontal and diagonal differences between the 4 group outputs.

19. The method of claim 14, wherein the predefined offset points include at least four points per pixel offset vertically, horizontally and diagonally.

20. A method of generating a super resolution image, the method comprising:
- capturing image data using an array camera having at least four cameras;
- parallax converging image data from each camera of the array camera based on different predefined offset points within a predefined sampling pattern to create a sub-pixel sampling pattern; and
- sampling the sub-pixel sampling pattern at an increased resolution.

* * * * *